United States Patent
Allen et al.

(10) Patent No.: US 10,642,928 B2
(45) Date of Patent: May 5, 2020

(54) ANNOTATION COLLISION DETECTION IN A QUESTION AND ANSWER SYSTEM

(71) Applicant: International Business Machines Corporation, Armonk, NY (US)

(72) Inventors: Corville O. Allen, Morrisville, NC (US); Scott R. Carrier, Apex, NC (US); Richard A. Salmon, Apex, NC (US); Robert C. Sizemore, Fuquay-Varina, NC (US)

(73) Assignee: International Business Machines Corporation, Armonk, NY (US)

(*) Notice: Subject to any disclaimer, the term of this patent is extended or adjusted under 35 U.S.C. 154(b) by 363 days.

(21) Appl. No.: 13/908,605

(22) Filed: Jun. 3, 2013

(65) Prior Publication Data
US 2014/0359421 A1 Dec. 4, 2014

(51) Int. Cl.
*G06F 17/20* (2006.01)
*G06F 17/24* (2006.01)
*G06Q 10/10* (2012.01)

(52) U.S. Cl.
CPC ......... *G06F 17/241* (2013.01); *G06Q 10/101* (2013.01)

(58) Field of Classification Search
CPC .......... G06K 9/00; G06F 17/00; G06F 17/27; G06F 17/2584; G06F 7/00; G06F 15/00; G06F 17/30
USPC .................. 715/230; 382/187; 707/104.1
See application file for complete search history.

(56) References Cited

U.S. PATENT DOCUMENTS

| | | | |
|---|---|---|---|
| 5,418,717 A | 5/1995 | Su et al. | |
| 5,873,056 A | 2/1999 | Liddy et al. | |
| 7,028,253 B1* | 4/2006 | Lieberman | G06F 17/30265 345/625 |
| 7,571,177 B2 | 8/2009 | Damle | |
| 7,574,048 B2* | 8/2009 | Shilman et al. | 382/187 |
| 7,593,943 B2* | 9/2009 | Clarke | G06Q 10/10 |
| 8,589,306 B1* | 11/2013 | Morriss | G06Q 50/184 705/1.1 |
| 9,396,279 B1* | 7/2016 | O'Donnell | G06F 16/986 |
| 9,461,834 B2* | 10/2016 | Ferlitsch | H04L 12/1827 |
| 10,346,532 B2* | 7/2019 | Codrington | G06F 16/93 |

(Continued)

OTHER PUBLICATIONS

Keet, "A Formal Theory of Granularity" at http://www.meteck.org/files/AFormalTheoryOfGranularity_CMK08.pdf, published in 2008.*

(Continued)

*Primary Examiner* — Mohammed H Zuberi
(74) *Attorney, Agent, or Firm* — Rakesh Roy

(57) ABSTRACT

Mechanisms are provided for resolving annotation conflicts in a portion of content. A portion of content is received and annotation operations are performed on it using a plurality of annotators. Each annotator in the plurality of annotators generates a set of annotations for the portion of content, thereby generating a plurality of sets of annotations for the portion of content. The plurality of sets of annotations are analyzed to identify a conflict between a first annotation and a second annotation in the plurality of sets of annotations. The conflict between the first annotation and the second annotation is resolved to generate a resultant set of annotations for the portion of content. The resultant set of annotations is stored in an annotations data structure associated with the portion of content.

20 Claims, 7 Drawing Sheets

(56) References Cited

U.S. PATENT DOCUMENTS

| | | | |
|---|---|---|---|
| 2003/0051214 A1* | 3/2003 | Graham | G06F 17/30017 715/230 |
| 2003/0182310 A1* | 9/2003 | Charnock | G06Q 10/10 |
| 2004/0102931 A1* | 5/2004 | Ellis | A61B 5/1038 702/188 |
| 2005/0125359 A1* | 6/2005 | Levin | G06Q 10/10 705/59 |
| 2006/0074980 A1* | 4/2006 | Sarkar | 707/104.1 |
| 2006/0271603 A1* | 11/2006 | Mathias | H04L 67/1095 |
| 2007/0005592 A1* | 1/2007 | Kender | G06N 5/02 |
| 2007/0260651 A1* | 11/2007 | Pedersen | G06F 17/30011 |
| 2008/0065685 A1* | 3/2008 | Frank | G06F 17/30241 |
| 2009/0125445 A1* | 5/2009 | Mousavi | G06F 21/10 705/59 |
| 2009/0177635 A1* | 7/2009 | Koohgoli | G06F 21/10 |
| 2009/0192845 A1* | 7/2009 | Gudipaty | G06Q 10/10 705/7.19 |
| 2009/0198689 A1* | 8/2009 | Frazier | G06F 21/645 |
| 2009/0199274 A1* | 8/2009 | Frazier | H04L 63/08 726/4 |
| 2009/0287678 A1 | 11/2009 | Brown et al. | |
| 2009/0292687 A1 | 11/2009 | Fan et al. | |
| 2009/0300046 A1* | 12/2009 | Abouyounes | G06F 17/30265 |
| 2009/0326919 A1* | 12/2009 | Bean | 704/9 |
| 2010/0004925 A1* | 1/2010 | Ah-Pine | G06F 17/241 704/9 |
| 2011/0066587 A1 | 3/2011 | Ferrucci et al. | |
| 2011/0125734 A1 | 5/2011 | Duboue et al. | |
| 2011/0252312 A1* | 10/2011 | Lemonik | G06F 17/248 715/255 |
| 2012/0185759 A1* | 7/2012 | Balinsky | G06F 21/6227 715/209 |
| 2013/0007055 A1 | 1/2013 | Brown et al. | |
| 2013/0018652 A1 | 1/2013 | Ferrucci et al. | |
| 2013/0036114 A1* | 2/2013 | Wong et al. | 707/732 |
| 2013/0066886 A1 | 3/2013 | Bagchi et al. | |
| 2013/0132071 A1* | 5/2013 | Peterson | 704/9 |
| 2013/0159938 A1* | 6/2013 | James | G06F 3/038 715/863 |
| 2014/0200878 A1* | 7/2014 | Mylonakis et al. | 704/4 |

OTHER PUBLICATIONS

Lee et al. "The conflict detection and resolution in knowledge merging for image annotation", Information Processing and Management 42(2006) 1030-1055, published by Elsevier, available online on Nov. 2, 2005, at www.sciencedirect.com (Year: 2005).*

High, Rob, "The Era of Cognitive Systems: An Inside Look at IBM Watson and How it Works", IBM Corporation, http://ip.com/pdf/redbook/REDP495500.pdf, 2012, 16 pages.

Yuan, Michael J. , "Watson and healtchare", IBM Corporation, developerWorks, http://www.ibm.com/developerworks/industry/library/ind-watson/, Apr. 12, 2011, pp. 1-14.

* cited by examiner

400

```
IMPORT A DOCUMENT HAVING A SET OF QUESTIONS BASED ON THE CONTENT
OF THE DOCUMENT
405
          │
          ▼
AUTOMATICALLY CREATE A CANDIDATE QUESTION FROM THE CONTENT
410
          │
          ▼
AUTOMATICALLY GENERATE ANSWERS FOR THE SET OF QUESTIONS AND
CANDIDATE QUESTION USING THE CONTENT
415
          │
          ▼
PRESENT THE SET OF QUESTIONS, CANDIDATE QUESTION, AND ANSWERS TO
THE CONTENT CREATOR FOR VERIFICATION
420
          │
          ▼
STORE THE VERIFIED SET OF QUESTIONS IN THE DOCUMENT
425
```

ANNOTATION COLLISION DETECTION IN A QUESTION AND ANSWER SYSTEM

BACKGROUND

The present application relates generally to an improved data processing apparatus and method and more specifically to mechanisms for detecting and rectifying annotation collisions in a question and answer system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for resolving annotation conflicts in a portion of content. The method comprises receiving, in the data processing system, a portion of content for annotating and performing, by the data processing system, annotation operations on the portion of content using a plurality of annotators. Each annotator in the plurality of annotators generates a set of annotations for the portion of content, thereby generating a plurality of sets of annotations for the portion of content. The method further comprises analyzing, by the data processing system, the plurality of sets of annotations for the portion of content to identify a conflict between a first annotation and a second annotation in the plurality of sets of annotations. Moreover, the method comprises resolving, by the data processing system, the conflict between the first annotation and the second annotation to generate a resultant set of annotations for the portion of content. In addition, the method comprises storing, by the data processing system, the resultant set of annotations in an annotations data structure associated with the portion of content.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts a flowchart diagram of one embodiment of a method for question/answer creation for a document;

DETAILED DESCRIPTION

Figure 1:
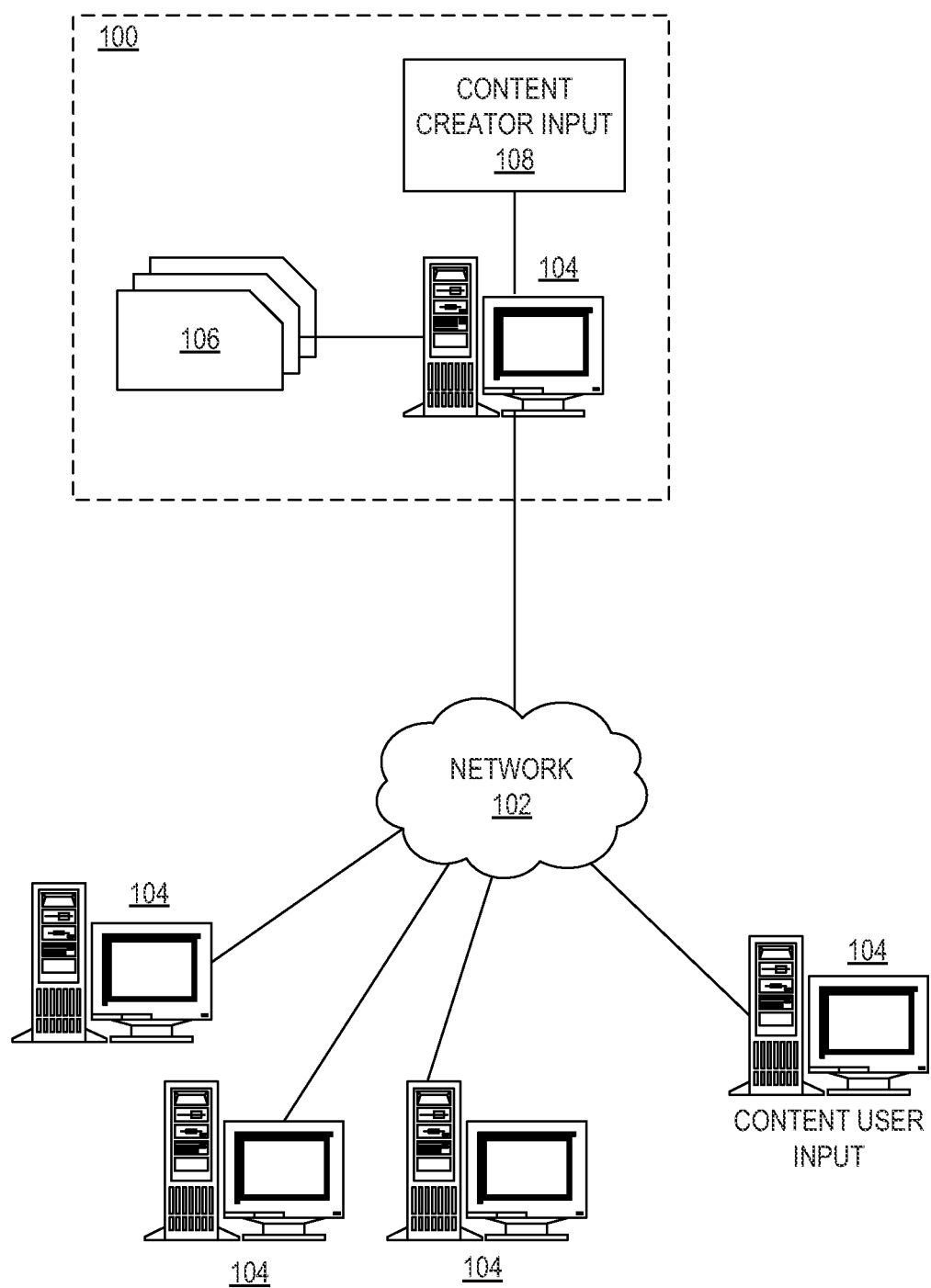
FIG. 1 depicts a schematic diagram of one illustrative embodiment of a question/answer (QA) system in a computer network.

In a question answer and answer (QA) system, such as the Watson™ QA system previously mentioned above, numerous annotators are used to analyze the input questions and the corpus of documents and other data used as a basis for generating answers to the input questions. An annotator is a program that takes a portion of input text, extracts structured information from it, and generates annotations, or metadata, that are attached by the annotator to the source/original text data. The term "annotation" refers to the process followed by the annotator and the resulting metadata that provides elements of structure that can be referenced or acted upon by other programs, annotators, or the like, that read and understand the annotated text data. Annotators may comprise logic configured in many different ways and for many different purposes. In general, annotators may look for particular words, combinations of words, perform context analysis for words, and the like, to identify the types of words in a portion of text, their purpose within the portion of text, e.g., parts of speech, types of information sought or being provided, and the like. Annotators may be generic, e.g., identifying nouns, names of persons, places, dates, etc., or specific to a particular purpose (e.g., identifying medical terms) or domain (e.g., identifying questions/content directed to pancreatic cancer diagnosis and treatment).

QA systems may be generic in nature or customized for a particular domain or subset of domains. A "domain" in the context of QA systems and the present description is a concept area, e.g., sports, financial industry, medical industry, legal concepts, etc. Domains may be defined at various granularities such that one domain may be a subset of a larger domain. For example, one domain may be "medical", a sub-domain may be "cancer", a sub-sub-domain may be "diagnosis and treatment," and yet another sub-sub-sub-domain may be "pancreatic cancer." QA systems may be configured to handle questions and provide answers of a particular domain or set of domains and sub-domains, possibly using a corpus of information that is specifically for that particular domain/sub-domains, e.g., medical records, journals, publications, etc. In such a case the QA system is trained specifically for the particular domains/sub-domains that it is intended to handle, including providing the QA system with annotators that are configured and trained for the particular domains/sub-domains.

Alternatively, a QA system may be more generic in nature such that it is configured to handle questions that may be directed to any domain or a large group of related and unrelated domains. In such a case, the QA system may have many different annotators that are configured to perform annotation operations either generically or with regard to a variety of different domains/sub-domains that may not be related to one another. As such, one annotator may annotate a question or portion of content in one way based on its particular configuration and training while another annotator may annotate the same question or portion of content in a different manner based on its different configuration and training. This provides an opportunity for annotations of the same question or portion of content to conflict with one another. That is, since multiple annotators are all running on the same source text, being it an input question or portion of content, the different annotators may annotate the same terms in the source text as being different elements, and these differences may conflict with one another, i.e. there may be annotation collisions.

Such annotation collisions may lead to degradation in the performance of the QA system. That is, such annotation collisions may cause the confidence scoring associated with the answers generated by the QA system to be skewed. For example, if a question directed to a medical issue is submitted and a term in the question is recognized by a medical annotator as requesting a symptom of an illness, but an annotator directed to a different industry, or a general annotator, recognizes the same term to be directed to a type of financial condition, then the second annotator may negatively impact the way in which the question is interpreted by the QA system and the types of candidate answers returned by the QA system. This will be expanded upon further hereafter with the description of the mechanisms of the illustrative embodiments.

The illustrative embodiments provide mechanisms for identifying conflicts between annotations and either automatically selecting an appropriate annotation for a specifying domain or presenting conflict information to a user for user feedback and input as to how to rectify the detected collision. The illustrative embodiments detect and determine the domain of an input question and then filter out annotations that have collisions and conflicts based on the determined domain using a computer learning model, stored historical use of an annotation, and term metadata. In one illustrative embodiment, term parts of speech information, annotation metadata, and the like, are used to identify a conflict level and then, based on the context and the sentence structure, a formula may be used to determine which annotations should be removed using thresholds and the like. These annotations may then be removed from consideration by scorer mechanisms, merger mechanisms, and the like, of a QA system to thereby improve their performance. That is, the illustrative embodiments essentially implement a domain-sensitive noise filter for a general purpose QA system pipeline. Furthermore, within the operation of the illustrative embodiments, annotators provide more meaning to their annotations since they can be correlated with a specific domain making them more distinct when used in a QA system pipeline.

In order to implement the annotation conflict identification and resolution mechanisms of the illustrative embodiments, the illustrative embodiments implement a domain determination engine that determines the domain to which an input question is directed based on the operation of annotators on the input question. That is, the input question is parsed and provided to a plurality of annotators which each operate on the input question according to their own individual logic and configurations to generate annotations for the terms in the input question. These annotators may be generic annotators looking for particular types of terms, e.g., nouns, verbs, places, dates, times, or the like, patterns of terms, etc. These annotators may further be programmed and configured for specific domains, such as health care terms, disease diagnosis terms, financial terms, legal terms, or patterns of terms within a particular domain, for example. Thus, each term in the input question may have separate sets of annotations for the various annotators that generate annotations for that particular term. Or, looking at it another way, a separate set of annotations for the input question is generated by each of the annotators that operate on the input question.

Based on the annotations generated by the various annotators for the various terms in the question, and the confidence scores associated with the annotations that are generated, the domain determination engine determines what the domain of the input question is. Alternatively, when the input question is received, a user may be prompted to identify the domain of the question and this selection of the domain may be used as a basis for performing annotation conflict resolution. In still a further illustrative embodiment, if the operation of the illustrative embodiments is being applied to a portion of content from a corpus of documents, for example, then metadata associated with the source of the portion of the content may be used to identify the domain for the portion of content. Of course, any combination of these may also be used as well to identify the domain of the particular portion of text being analyzed by the mechanisms of the illustrative embodiments.

The sets of annotations generated by the various annotators operating on the input question, or portion of content if the mechanisms are applied to other content other than an input question are checked to see if any of the annotations for a particular term conflict with one another. If a conflict is present, then a reverse lookup of the term in a language model for the particular identified domain of the input question/portion of content is performed, and/or a lookup of a matching term usage in a domain specific corpora is made. If a match of the term, and its associated annotation, is found in the domain specific language model or domain specific corpora is found, and the matching usage of the term meets certain predetermined criteria, then the annotation is considered relevant and is maintained while other conflicting annotations are eliminated and is not used by later downstream portions of the QA system pipeline. In this way, domain specific filtering of annotations is performed in a QA system pipeline so as to improve the overall performance of the QA system.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. FIGS. 1-5 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to clustering questions based on identified attributes of the questions for purposes of training the QA system and/or identifying a confidence that a subsequently submitted question is likely to be answered correctly based on how well the question matches a previously defined question cluster generated during training.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-5 are only examples and are not intended to state or imply any limitation with regard to the type of QA mechanisms with which the illustrative embodiments may be implemented. Many modifications to the example QA system shown in FIGS. 1-5 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more content users. Other embodiments of the QA system 100 may be used with components, systems, sub-systems, and/or devices other than those that are depicted herein.

The QA system 100 may be configured to receive inputs from various sources. For example, the QA system 100 may receive input from the network 102, a corpus of electronic documents 106 or other data, a content creator 108, content users, and other possible sources of input. In one embodiment, some or all of the inputs to the QA system 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that the QA system 100 may operate in environments of any size, including local and global, e.g., the Internet.

In one embodiment, the content creator creates content in a document 106 for use as part of a corpus of data with the QA system 100. The document 106 may include any file, text, article, or source of data for use in the QA system 100. Content users may access the QA system 100 via a network connection or an Internet connection to the network 102, and may input questions to the QA system 100 that may be answered by the content in the corpus of data. In one embodiment, the questions may be formed using natural language. The QA system 100 may interpret the question and provide a response to the content user containing one or more answers to the question. In some embodiments, the QA system 100 may provide a response to users in a ranked list of answers.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Figure 2:
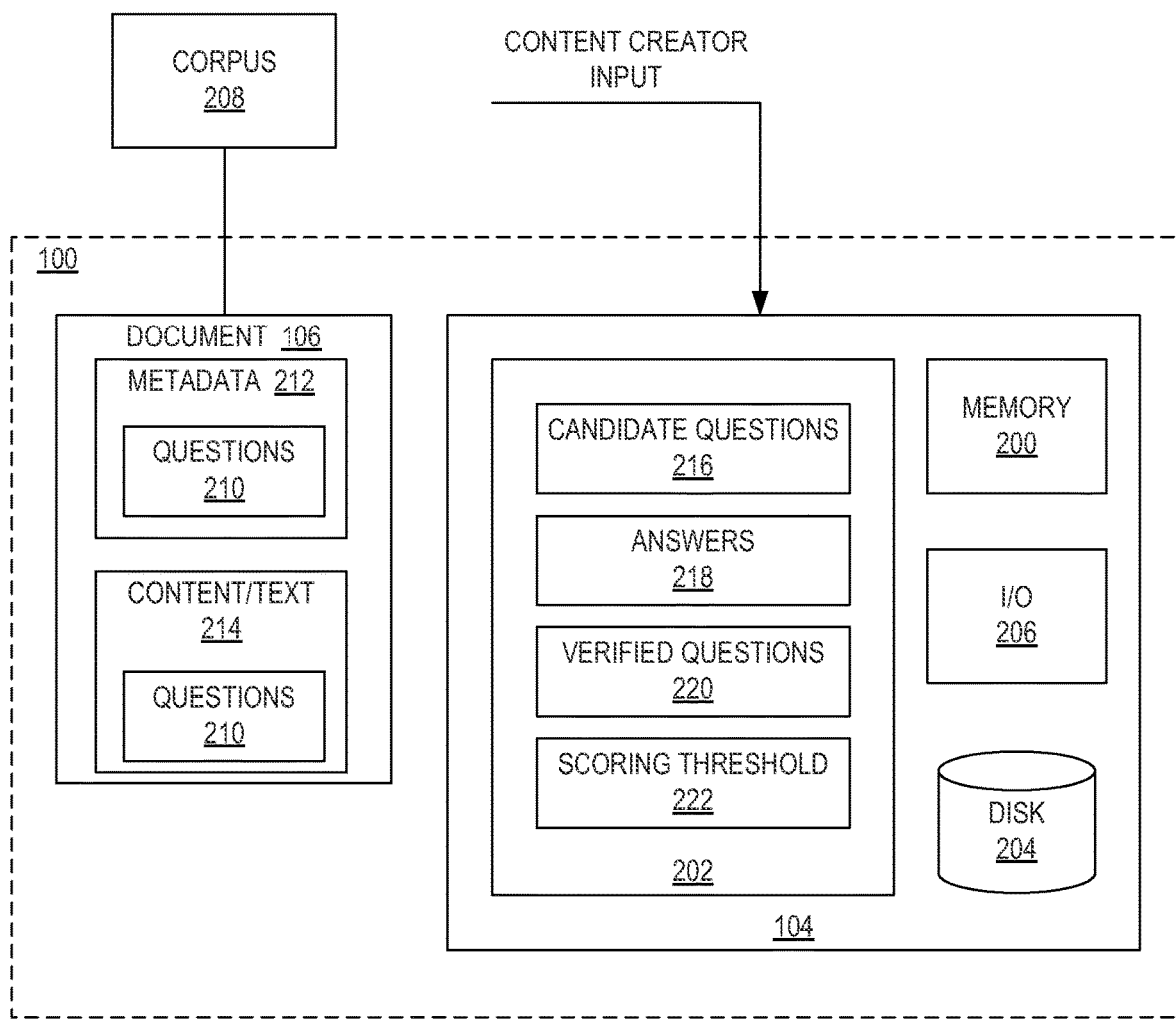
FIG. 2 depicts a schematic diagram of one embodiment of the QA system of FIG. 1.

FIG. 2 depicts a schematic diagram of one embodiment of the QA system 100 of FIG. 1. The depicted QA system 100 includes various components, described in more detail below, that are capable of performing the functions and operations described herein. In one embodiment, at least some of the components of the QA system 100 are implemented in a computer system. For example, the functionality of one or more components of the QA system 100 may be implemented by computer program instructions stored on a computer memory device 200 and executed by a processing device, such as a CPU. The QA system 100 may include other components, such as a disk storage drive 204, and input/output devices 206, and at least one document 106 from a corpus 208. Some or all of the components of the QA system 100 may be stored on a single computing device 104 or on a network of computing devices 104, including a wireless communication network. The QA system 100 may include more or fewer components or subsystems than those depicted herein. In some embodiments, the QA system 100 may be used to implement the methods described herein as depicted in FIG. 4 and may be augmented or configured to implement the additional operations, functionality, and features described hereafter with regard to the illustrative embodiments describes in conjunction with the subsequent figures.

In one embodiment, the QA system 100 includes at least one computing device 104 with a processor 202 for performing the operations described herein in conjunction with the QA system 100. The processor 202 may include a single processing device or multiple processing devices. The processor 202 may have multiple processing devices in different computing devices 104 over a network such that the operations described herein may be performed by one or more computing devices 104. The processor 202 is connected to and in communication with the memory device. In some embodiments, the processor 202 may store and access data on the memory device 200 for performing the operations described herein. The processor 202 may also be connected to a storage disk 204, which may be used for data storage, for example, for storing data from the memory device 200, data used in the operations performed by the processor 202, and software for performing the operations described herein.

In one embodiment, the QA system 100 imports a document 106. The electronic document 106 may be part of a larger corpus 208 of data or content, which may contain electronic documents 106 related to a specific topic or a variety of topics. The corpus 208 of data may include any number of documents 106 and may be stored in any location relative to the QA system 100. The QA system 100 may be capable of importing any of the documents 106 in the corpus 208 of data for processing by the processor 202. The processor 202 may communicate with the memory device 200 to store data while the corpus 208 is being processed.

The document 106 may include a set of questions 210 generated by the content creator at the time the content was created. When the content creator creates the content in the document 106, the content creator may determine one or more questions that may be answered by the content or for specific use cases for the content. The content may be created with the intent to answer specific questions. These questions may be inserted into the content, for example, by inserting the set of questions 210 into the viewable content/text 214 or in metadata 212 associated with the document 106. In some embodiments, the set of questions 210 shown in the viewable text 214 may be displayed in a list in the document 106 so that the content users may easily see specific questions answered by the document 106.

The set of questions 210 created by the content creator at the time the content is created may be detected by the processor 202. The processor 202 may further create one or more candidate questions 216 from the content in the document 106. The candidate questions 216 include questions that are answered by the document 106, but that may not have been entered or contemplated by the content creator. The processor 202 may also attempt to answer the set of questions 210 created by the content creator and candidate questions 216 extracted from the document 106, "extracted" meaning questions that are not explicitly specified by the content creator but are generated based on analysis of the content.

In one embodiment, the processor 202 determines that one or more of the questions are answered by the content of the document 106 and lists or otherwise marks the questions that were answered in the document 106. The QA system 100 may also attempt to provide answers 218 for the candidate questions 216. In one embodiment, the QA system 100 answers 218 the set of questions 210 created by the content creator before creating the candidate questions 216. In another embodiment, the QA system 100 answers 218 the questions and the candidate questions 216 at the same time.

The QA system 100 may score question/answer pairs generated by the system. In such an embodiment, question/answer pairs that meet a scoring threshold are retained, and question/answer pairs that do not meet the scoring threshold 222 are discarded. In one embodiment, the QA system 100 scores the questions and answers separately, such that questions generated by the system 100 that are retained meet a question scoring threshold, and answers found by the system 100 that are retained meet an answer scoring threshold. In another embodiment, each question/answer pair is scored according to a question/answer scoring threshold.

After creating the candidate questions 216, the QA system 100 may present the questions and candidate questions 216 to the content creator for manual user verification. The content creator may verify the questions and candidate questions 216 for accuracy and relatedness to the content of the document 106. The content creator may also verify that the candidate questions 216 are worded properly and are easy to understand. If the questions contain inaccuracies or are not worded properly, the content creator may revise the content accordingly. The questions and candidate questions 216 that have been verified or revised may then be stored in the content of the document 106 as verified questions, either in the viewable text 214 or in the metadata 212 or both.

Figure 3:
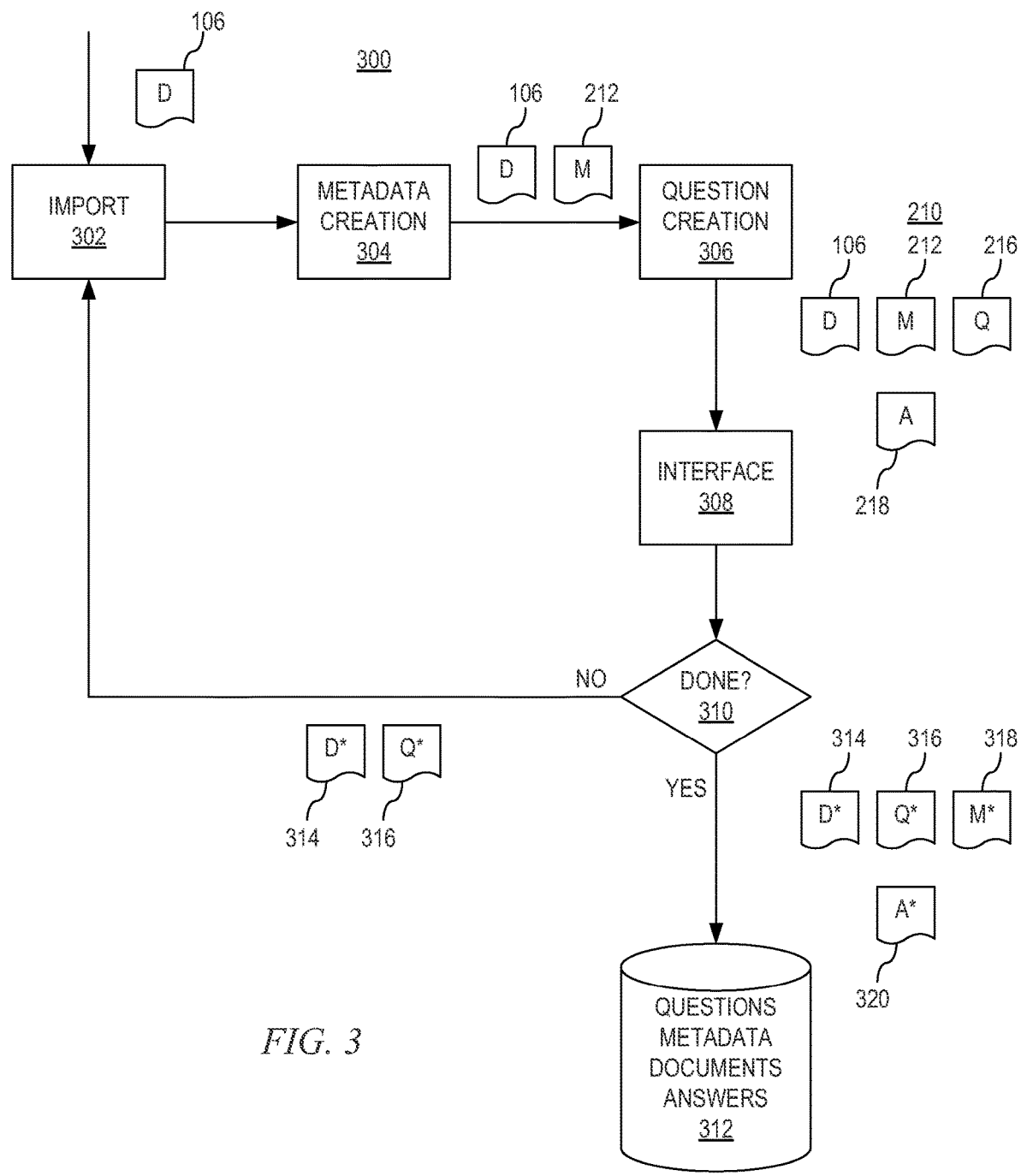
FIG. 3 depicts a flowchart diagram of one embodiment of a method for question/answer creation for a document.

FIG. 3 depicts a flowchart diagram of one embodiment of a method 300 for question/answer creation for a document 106. Although the method 300 is described in conjunction with the QA system 100 of FIG. 1, the method 300 may be used in conjunction with any type of QA system.

In one embodiment, the QA system 100 imports 302 one or more electronic documents 106 from a corpus 208 of data. This may include retrieving the documents 106 from an external source, such as a storage device in a local or remote computing device 104. The documents 106 may be processed so that the QA system 100 is able to interpret the content of each document 106. This may include parsing the content of the documents 106 to identify questions found in the documents 106 and other elements of the content, such as in the metadata associated with the documents 106, questions listed in the content of the documents 106, or the like. The system 100 may parse documents using document markup to identify questions. For example, if documents are in extensible markup language (XML) format, portions of the documents could have XML question tags. In such an embodiment, an XML parser may be used to find appropriate document parts. In another embodiment, the documents are parsed using native language processing (NLP) techniques to find questions. For example, the NLP techniques may include finding sentence boundaries and looking at sentences that end with a question mark or other methods. The QA system 100 may use language processing techniques to parse the documents 106 into sentences and phrases, for example.

In one embodiment, the content creator creates 304 metadata 212 for a document 106, which may contain information related to the document 106, such as file information, search tags, questions created by the content creator, and other information. In some embodiments, metadata 212 may already be stored in the document 106, and the metadata 212 may be modified according to the operations performed by the QA system 100. Because the metadata 212 is stored with the document content, the questions created by the content creator may be searchable via a search engine configured to perform searches on the corpus 208 of data, even though the metadata 212 may not be visible when the document 106 is opened by a content user. Thus, the metadata 212 may include any number of questions that are answered by the content without cluttering the document 106.

The content creator may create 306 more questions based on the content, if applicable. The QA system 100 also generates candidate questions 216 based on the content that may not have been entered by the content creator. The candidate questions 216 may be created using language processing techniques designed to interpret the content of the document 106 and generate the candidate questions 216 so that the candidate questions 216 may be formed using natural language.

When the QA system 100 creates the candidate questions 216 or when the content creator enters questions into the document 106, the QA system 100 may also locate the questions in the content and answer the questions using language processing techniques. In one embodiment, this process includes listing the questions and candidate questions 216 for which the QA system 100 is able to locate answers 218 in the metadata 212. The QA system 100 may also check the corpus 208 of data or another corpus 208 for comparing the questions and candidate questions 216 to other content, which may allow the QA system 100 to determine better ways to form the questions or answers 218. Examples of providing answers to questions from a corpus are described in U.S. Patent Application Publication No. 2009/0287678 and U.S. Patent Application Publication No. 2009/0292687, which are herein incorporated by reference in their entirety.

The questions, candidate questions 216, and answers 218 may then be presented 308 on an interface to the content creator for verification. In some embodiments, the document text and metadata 212 may also be presented for verification. The interface may be configured to receive a manual input from the content creator for user verification of the questions, candidate questions 216, and answers 218. For example, the content creator may look at the list of questions and answers 218 placed in the metadata 212 by the QA system 100 to verify that the questions are paired with the appropriate answers 218, and that the question-answer pairs are found in the content of the document 106. The content creator may also verify that the list of candidate questions 216 and answers 218 placed in the metadata 212 by the QA system 100 are correctly paired, and that the candidate question-answer pairs are found in the content of the document 106. The content creator may also analyze the questions or candidate questions 216 to verify correct punctuation, grammar, terminology, and other characteristics to improve the questions or candidate questions 216 for searching and/or viewing by the content users. In one embodiment, the content creator may revise poorly worded or inaccurate questions and candidate questions 216 or content by adding terms, adding explicit questions or question templates that the content answers 218, adding explicit questions or question templates that the content does not answer, or other revisions. Question templates may be useful in allowing the content creator to create questions for various topics using the same basic format, which may allow for uniformity among the different content. Adding questions that the content does not answer to the document 106 may improve the search accuracy of the QA system 100 by eliminating content from the search results that is not applicable to a specific search.

After the content creator has revised the content, questions, candidate questions 216, and answers 218, the QA system 100 may determine 310 if the content finished being processed. If the QA system 100 determines that the content is finished being processed, the QA system 100 may then store 312 the verified document 314, verified questions 316, verified metadata 318, and verified answers 320 in a data store on which the corpus 208 of data is stored. If the QA system 100 determines that the content is not finished being processed—for example if the QA system 100 determines that additional questions may be used—the QA system 100 may perform some or all of the steps again. In one embodiment, the QA system 100 uses the verified document and/or the verified questions to create new metadata 212. Thus, the content creator or QA system 100 may create additional questions or candidate questions 216, respectively. In one embodiment, the QA system 100 is configured to receive feedback from content users. When the QA system 100 receives feedback from content users, the QA system 100 may report the feedback to the content creator, and the content creator may generate new questions or revise the current questions based on the feedback.

FIG. 4 depicts a flowchart diagram of one embodiment of a method 400 for question/answer creation for a document 106. Although the method 400 is described in conjunction with the QA system 100 of FIG. 1, the method 400 may be used in conjunction with any QA system.

The QA system 100 imports 405 a document 106 having a set of questions 210 based on the content of the document 106. The content may be any content, for example content directed to answering questions about a particular topic or a range of topics. In one embodiment, the content creator lists and categorizes the set of questions 210 at the top of the content or in some other location of the document 106. The categorization may be based on the content of the questions, the style of the questions, or any other categorization technique and may categorize the content based on various established categories such as the role, type of information, tasks described, and the like. The set of questions 210 may be obtained by scanning the viewable content 214 of the document 106 or metadata 212 associated with the document 106. The set of questions 210 may be created by the content creator when the content is created. In one embodiment, the QA system 100 automatically creates 410 at least one suggested or candidate question 216 based on the content in the document 106. The candidate question 216 may be a question that the content creator did not contemplate. The candidate question 216 may be created by processing the content using language processing techniques to parse and interpret the content. The system 100 may detect a pattern in the content of the document 106 that is common for other content in the corpus 208 to which the document 106 belongs, and may create the candidate question 216 based on the pattern.

The QA system 100 also automatically generates 415 answers 218 for the set of questions 210 and the candidate question 216 using the content in the document 106. The QA system 100 may generate the answers 218 for the set of questions 210 and the candidate question 216 at any time after creating the questions and candidate question 216. In some embodiments, the answers 218 for the set of questions 210 may be generated during a different operation than the answer for the candidate question 216. In other embodiments, the answers 218 for both the set of questions 210 and the candidate question 216 may be generated in the same operation.

The QA system 100 then presents 420 the set of questions 210, the candidate question 216, and the answers 218 for the set of questions 210 and the candidate question 216 to the content creator for user verification of accuracy. In one embodiment, the content creator also verifies the questions and candidate questions 216 for applicability to the content of the document 106. The content creator may verify that the content actually contains the information contained in the questions, candidate question 216, and respective answers 218. The content creator may also verify that the answers 218 for the corresponding questions and candidate question 216 contain accurate information. The content creator may also verify that any data in the document 106 or generated by the QA system 100 in conjunction with the QA system 100 is worded properly.

A verified set of questions 220 may then be stored 425 in the document 106. The verified set of questions 220 may include at least one verified question from the set of questions 210 and the candidate question 216. The QA system 100 populates the verified set of questions 220 with questions from the set of questions 210 and candidate questions 216 that are determined by the content creator to be accurate. In one embodiment, any of the questions, candidate questions 216, answers 218, and content that is verified by the content creator is stored in the document 106, for example, in a data store of a database.

The above description illustrates the manner by which content creators may generate metadata for use by a QA system 100 when performing answer generation for input questions. As discussed above, the QA system 100 also is used to answer input questions submitted by users via one or more client computing devices. For example, in a healthcare domain, the QA system 100 may be utilized to receive questions directed to medical issues, such as diagnosis, treatment, and the like. The QA system 100 may process such input questions through a QA system analysis pipeline to evaluate the input question against a corpus of data/information, which may include documents or content having associated metadata as previously described above, unstructured documents, or the like, and generate one or more potential answers to the input question.

Figure 5:
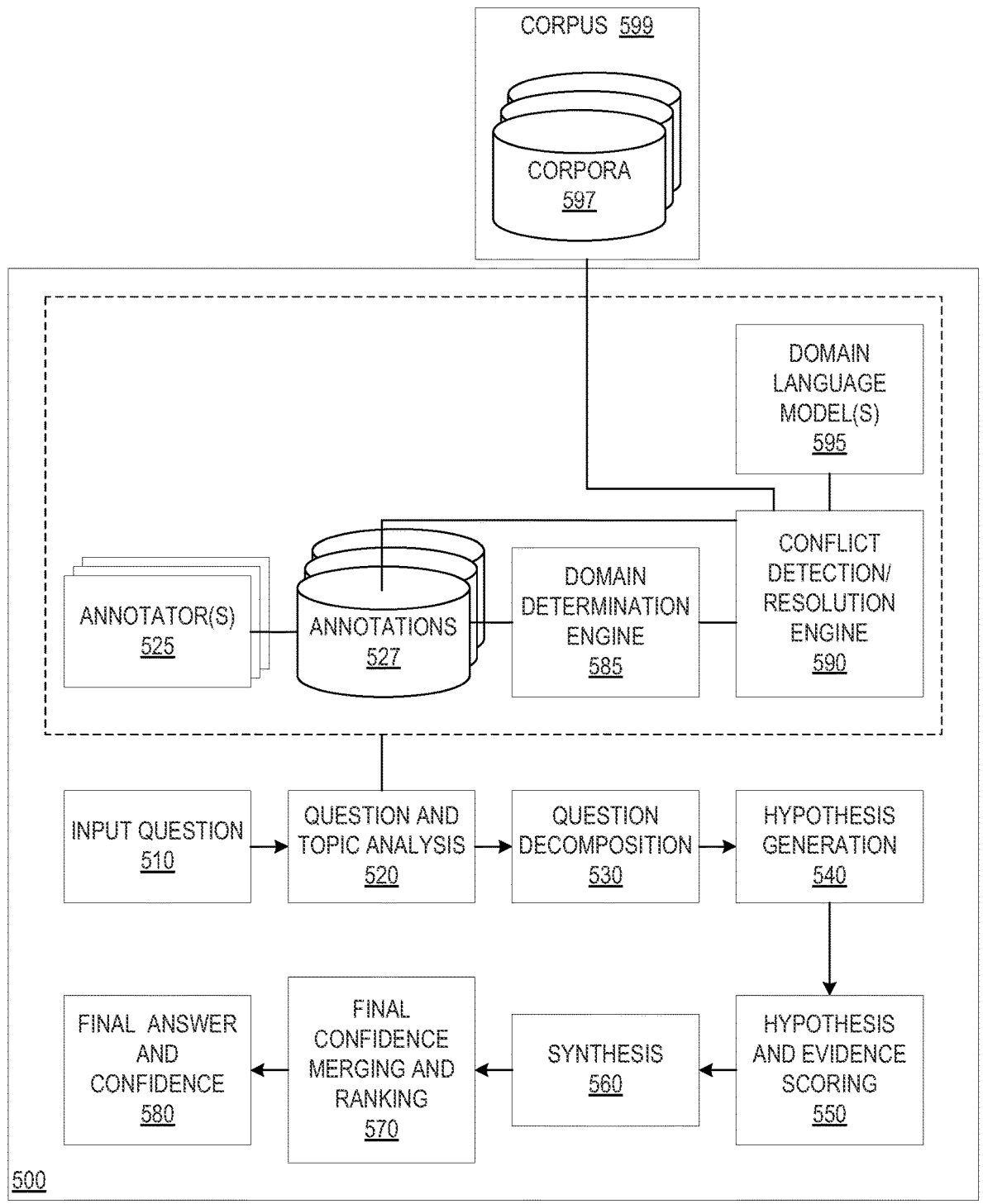
FIG. 5 is an example block diagram of a question and answer system analysis pipeline in accordance with one illustrative embodiment.

FIG. 5 illustrates a QA system pipeline for processing an input question in accordance with one illustrative embodiment. It should be appreciated that the stages of the QA system pipeline shown in FIG. 5 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems.

As shown in FIG. 5, the QA system pipeline 500 comprises a plurality of stages 510-580 through which the QA system operates to analyze an input question and generate a final response. In an initial question input stage 510, the QA system receives an input question that is presented in a natural language format. That is, a user may input, via a user interface, an input question for which the user wishes to obtain an answer, e.g., "Who are Putin's closest advisors?" In response to receiving the input question, the next stage of the QA system pipeline 500, i.e. the question and topic analysis stage 520, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Putin" may be identified as a proper name of a person with which the question is associated, "closest" may be identified as a word indicative of proximity or relationship, and "advisors" may be indicative of a noun or other language topic.

The identified major features may then be used during the question decomposition stage 530 to decompose the question into one or more queries that may be applied to the corpus of data/information in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpus of data/information. The queries being applied to the corpus of data/information generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA system pipeline 500, in stage 550, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 560, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 570 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, may be generated and output to the submitter of the original input question.

As shown in FIG. 5, in accordance the illustrative embodiments, as part of the question and topic analysis stage 520, annotators 525 are utilized to perform the feature extraction and annotation. That is, the annotations identify the types of features extracted from the input question, e.g., nouns, verbs, places, names, values, or domain specific types. As mentioned above, the annotators 520 may comprise annotators of various domains including generic all inclusive domains, specialized domains for particular industries, topics, and the like, or any granularity of domain between general and specialized. The annotations may be stored as separate sets of annotations 527, associated with the input question, generated by each annotator 525. The annotations 527 may be stored as separate data structures from the input question or may be stored as metadata of the input question. Thus, a first set of annotations may comprise annotations generated by an annotator configured to annotate financial terms in input questions. A second set of annotations may comprise annotations generated by an annotator configured to perform English language parts of speech identification. It should be appreciated that an annotator may actually not generate any annotations at all if the input question does not comprise terms or patterns of content matching those terms and patterns of content for which the annotator is configured to identify and annotate.

In one illustrative embodiment, the annotations may comprise parts of speech, definitions and/or types of terms, and expected context information. The parts of speech portion of an annotation identifies whether the term, phrase, or portion of text is a noun, verb, preposition, prepositional phrase, adverb, adjective, or other part of speech of a particular language. The definitions annotations provide the definitions of terms or patterns of terms from the viewpoint of the domain for which the annotation is configured. Thus, in one annotator a term may have a first definition, and in another annotator, the same term may have a second, different definition. The same is true of type designations, where the type may be domain specific. Furthermore, the type may designate such things as the focus of the input question, the lexical answer type (LAT) of the question, and other structural annotations associated with the terms, pattern of terms, or the like. The expected context information annotations comprise the expected domain of the question determined from analysis of the various parts of the question, e.g., that the question is determined to be in the financial, medical, oncology, English grammar, or other type of domain (subject matter area) that is expected to be the most likely area to provide a correct answer for the question.

Once the annotators 525 have annotated the input question, domain determination engine 585 determines a domain of the input question. Based on the annotations generated by the various annotators for the various terms in the question, patterns of terms, or the like, and the confidence scores associated with the annotations that are generated, the domain determination engine determines what the domain of the input question is. For example, one methodology for determining a domain of the input question is to match the set of terms of the input question and determine if they match a previously defined ontology, or map to a domain for which the system has been trained. In such a case, the terms of the annotations of the input question and the terms in the ontology may be paired up and the associated confidence scores of the annotations may be evaluated to thereby map the high confidence annotations to a domain, i.e., the annotators with highest confidence may impact or suggest a specific domain.

As another example methodology for determining a domain, the domain of the input question may be identified based on a domain of the annotator providing annotations with a highest confidence score for the annotations generated. Moreover, a more complex analysis may be employed in which, for example, weights may be given to different annotators based on their granularity of domain, e.g., more specific domains are given greater weight than more generic domains so that if a specific domain annotator generates annotations having a confidence score similar to the annotations generated by a more generic annotator, then the specific domain annotator may be given greater priority. Other priority mechanisms may be used to select annotators and their domains as being representative of the domain for the input question.

Alternatively, when the input question is received, a user may be prompted to identify the domain of the question and this selection of the domain may be forwarded with the input question and used as a basis for determining the domain of the input question. In an illustrative embodiment in which the operation of the illustrative embodiment is being applied to a portion of content from a corpus of documents, rather than an input question, then metadata associated with the source of the portion of the content may be used to identify the domain for the portion of content. Of course, any combination of these may also be used as well to identify the domain of the particular portion of text being analyzed by the mechanisms of the illustrative embodiments.

The sets of annotations generated by the various annotators operating on the input question 510, or portion of content if the mechanisms are applied to other content other than an input question are checked to see if any of the annotations for a particular term conflict with one another. This check is performed by the annotation conflict detection and resolution engine 590 prior to the annotations being provided to the question decomposition stage 530 for use in generating queries against the corpus of content used to generate answers for the input question 510. A conflict is present if two or more annotations for a same term, pattern of terms, or portion of the content whose annotations are being analyzed, are different from one another, e.g., one annotator annotates a term to be a noun and another annotator indicates the term to be a verb.

For example, consider the statement "John should have short AMG." With a general purpose annotator, this statement may be parsed and annotated in the following manner (with annotations indicated in parenthesis): "John (Noun) should have (Verb) short (Noun) AMG (Unknown, Noun)". However, a financial domain based annotator may recognize the term "short" to be a verb/adverb part of speech indicating the operation of "selling commodities high, buy low to return to holdings" or "sells borrowed stocks." Furthermore, the financial domain annotator may be configured to identify particular types of terms corresponding to the financial industry, such as stock names, mutual fund names, stock exchanges, and the like. Thus, the financial domain annotator may annotate the same statement as follows: "John (Noun) should have (Verb) short (Verb) AMG (Noun, stock name)." Hence if both annotators were to run on the same statement, the annotators would generate annotations that conflict with one another both with regard to the term "short" and with the term "AMG". These annotation conflicts may be identified by the mechanisms of the illustrative embodiments and rectified based on the determined domain of the content being analyzed, e.g., the input question or the portion of the corpus being analyzed.

That is, the annotation conflict detection and resolution engine 590, either in parallel with the operation of the annotators 525, or after operation by the annotators 525, in generating the annotations 527, may analyze the various annotations 527 generated by each of the annotators and compare them to other annotations generated by other annotators for the same term, pattern of terms, portion of content, or the like. If there are different annotations for the same term, pattern, or portion of content, then a conflict is detected. Alternatively, in a more complex embodiment, differences between annotations may be further analyzed to identify whether a different is actually a conflict or a non-conflicting difference. For example, if one annotation is a sub-set, sub-type, or sub-category of another annotation, then a conflict may not be present even though there is an identified difference in the annotations. For example, if one annotator identifies a term as a "cancer type" and another annotator identifies the same term as a "lymphoma", then lymphoma is a sub-category or type of "cancer" and in some illustrative embodiments a conflict may not be designated to exist with these annotations. The annotation conflict detection and resolution engine 590 may be configured and have logic for distinguishing between differences in annotations and actual conflicts in annotations based on such identified differences.

If a conflict is present, then a reverse lookup of the term in a language model 595 for the particular identified domain of the input question/portion of content is performed, and/or a lookup of a matching term usage in a domain specific corpora 597 of the corpus 599 used for performing candidate answer generation, is made. That is, the domain identified by the domain determination engine 585 is used to identify a corresponding domain language model 595 if one exists, or else a default domain language model 595 may be used. In addition, or alternatively, a domain specific corpora 597 within the corpus 599, that corresponds to the identified domain may be identified. A search for the term, pattern of terms, or portion of content, with its association annotations is performed to identify not only the matching, or similar, term, pattern of terms, or portion of content, but a matching/similar annotation to that of the conflicting annotation. If a match of the term (pattern of terms, portion of content, etc.), and its associated annotation(s), is found in the domain specific language model 595 or domain specific corpora 597 is found, and the matching usage of the term meets certain predetermined criteria, e.g., predetermined number of instances within the model or corpora 595, then the annotation is considered relevant and is maintained for use by the further stages of the pipeline 500 while other conflicting annotations that are not found within the model 595 or domain specific corporate 597, or which do not meet the threshold predetermined criteria, are eliminated and are not used by later down-stream portions of the QA system pipeline 500.

The annotations that pass the conflict detection and resolution operations performed by the conflict detection and resolution engine 590 are forwarded along to the question decomposition stage 530 with subsequent use in the other downstream stages 540-580 of the QA system pipeline 500 to generate candidate answers and ultimately a final answer for the input question 510 in the manner previously described above. In this way, domain specific filtering of annotations 527 is performed in a QA system pipeline 500 so as to improve the overall performance of the QA system. This improvement is achieved since the conflicting annotations will tend to skew the confidence scoring in the answers generated based on the terms, pattern of terms, or portions of content. This skew may artificially increase the confidence, i.e. indicating that the answer is much more likely to be the correct answer than it really is, or decrease the confidence, i.e. indicating that the answer is much less likely to be the correct answer than it really is. For example, if a general purpose annotator provide a general annotation for a term, that general annotation for that term may be found much more often within the corpus 599 that a more domain specific annotation for the same term and may artificially increase the confidence score associated with that term. For example, a scoring algorithm in the candidate answer scoring phase may take the presence of a particular annotation or set of annotations in a domain as significant such that when they exist they skew the score for a candidate answer adding a large weight. This filtering helps to normalize and sometimes eliminate this type of activity.

As mentioned above, it should be appreciated that while the illustrative embodiments are described above as being performed with regard to an input question to a QA system, the illustrative embodiments are not limited to such. Rather, the illustrative embodiments may be applied to any portion of content, either in an input question, a portion of content in one or more documents or other sources of information in the corpus 599, or the like. Thus, in some illustrative embodiments, the conflict identification and resolution may be applied to annotations generated for documents in the corpus 599 so as to improve the annotations stored in the metadata associated with these documents which may later be used by the QA system when performing candidate answer identification, hypothesis evidence evaluations, and the like.

Figure 6:
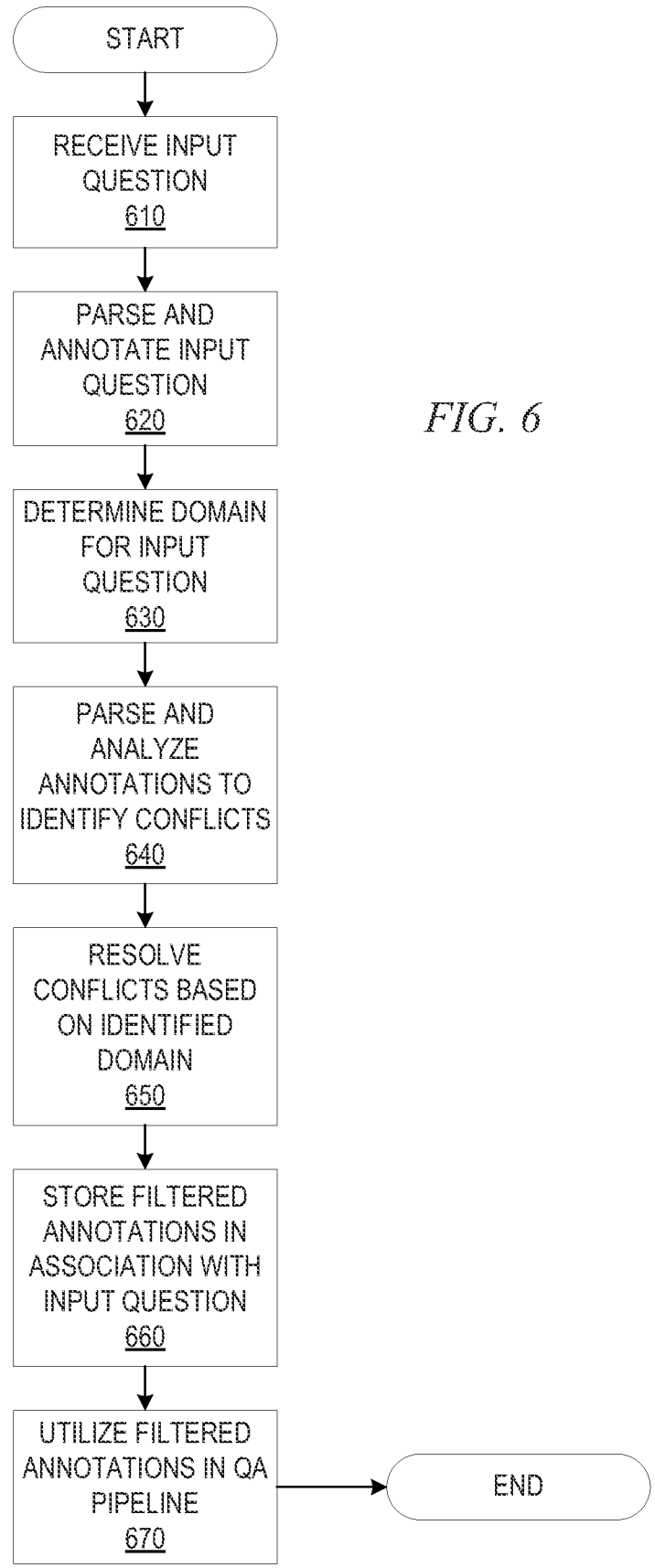
FIG. 6 is a flowchart outlining an example operation for annotation conflict identification in accordance with one illustrative embodiment.

FIG. 6 is a flowchart outlining an example operation for annotation conflict identification in accordance with one illustrative embodiment. As an example implementation, FIG. 6 and the following flowcharts will assume that the mechanisms of the illustrative embodiments are being applied to an input question received by a QA system. However, as mentioned above, in other illustrative embodiments, the mechanisms of the illustrative embodiments may be applied to any portion of content that may be annotated and whose annotations may have conflicts.

As shown in FIG. 6, the operation starts by receiving an input question for processing by the QA system (step 610). The input question is parsed and processed by a plurality of annotators to generate a plurality of sets of annotations (step 620). A domain for the input question is determined by analyzing the annotations for the input question and their associated confidence measures (step 630). The annotations for the input question are then parsed, analyzed, and compared to identify any conflicts between annotations (step 640). The conflicts are resolved based on the identified domain for the input question by filtering out conflicting annotations that do not meet predetermined criteria with regard to the identified domain (step 650). A resulting filtered set of annotations are maintained in association with the input question (step 660). The filtered set of annotations are provided along with the parsed input question to downstream stages of the QA system pipeline for candidate answer generation and evaluation (step 670). The operation then terminates.

Figure 7:
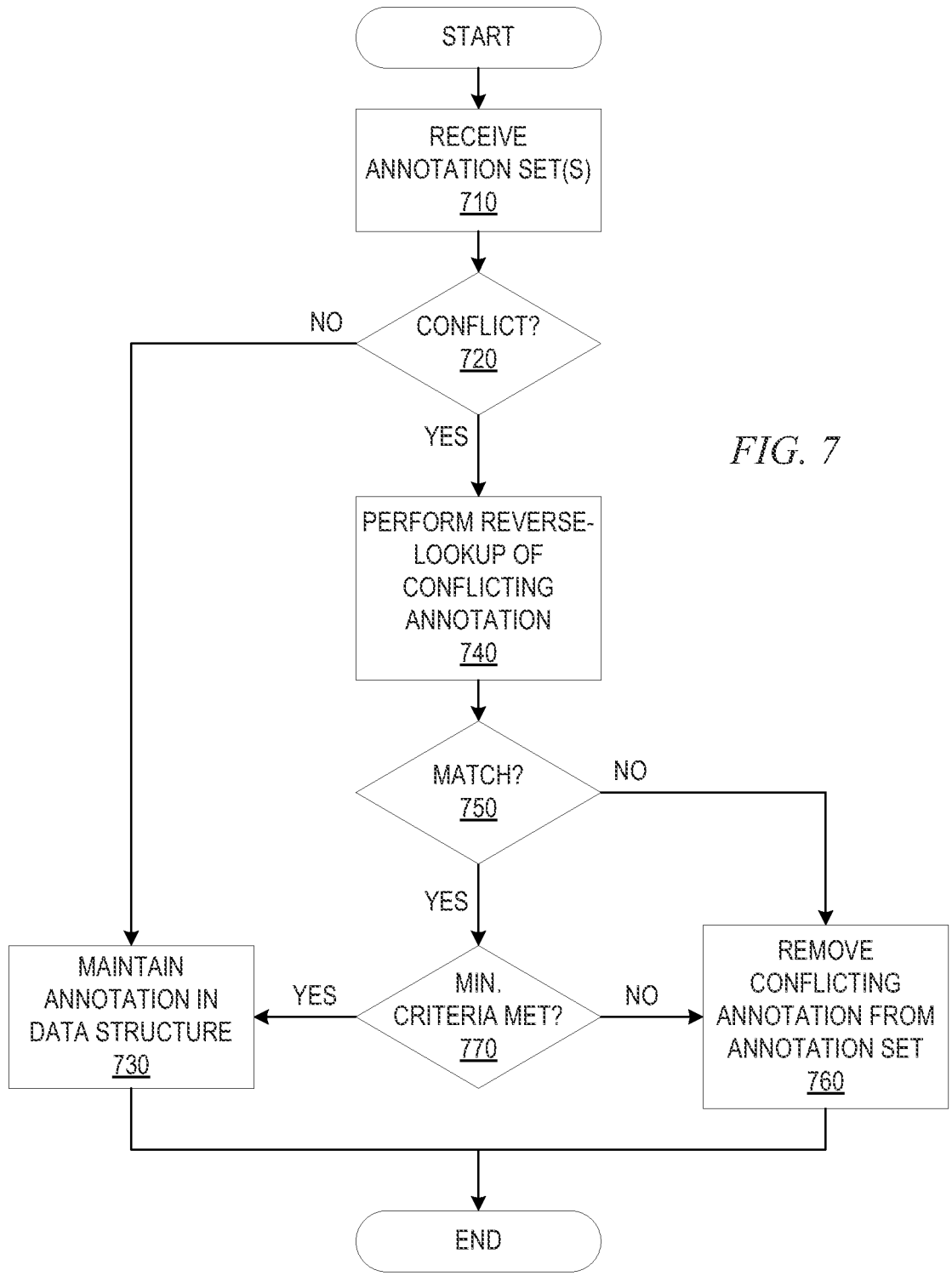
FIG. 7 is a flowchart outlining an example operation for performing annotation conflict resolution.

FIG. 7 is a flowchart outlining an example operation for performing annotation conflict resolution. As shown in FIG. 7, the operation starts by receiving the various sets of annotations for a term, pattern of terms, portion of content, or the like (step 710). Continuing the example of FIG. 6, these annotations may be for a particular term or set of terms in the input question, or for the entire input question, for example. A determination is made as to whether there is a conflict between any of the sets of annotations for the term, pattern of terms, or portion of content (step 720). These conflicts may be conflicts between parts of speech, definitions or type designations associated with the term, pattern of terms, portion of content, or the like.

If there are no conflicts identified, then the annotations are maintained in an annotation data structure associated with the portion of content (step 730). If a conflict is identified, then a reverse-lookup operation is performed based on the identified domain associated with the portion of content (step 740), e.g., the input question as identified in step 630 of FIG. 6. This may be done by performing the reverse-lookup in a domain related language model, domain specific corpora, or the like. If domain specific corpora or language models are not present, then default corpora and language models may be used.

A determination is made as to whether there are matching instances of the portion of content and associated conflicting annotations in the domain specific language model and/or corpora (step 750). If not, then the conflicting annotation is removed from the set of annotations for the portion of content (step 760). Which conflicting annotation to remove may be selected based on various criteria including, but not limited to, removing the conflicting annotation having a least confidence value or removing a conflicting annotation that does not match a domain or ontology. Another alternative is to analyze surrounding annotations and their domains and then remove the conflicting annotation that does not reflect the same domain as the majority of the other surrounding annotations.

If there are matching instances found, then a determination is made as to whether the matching instances meet predetermined minimum criteria for maintaining the conflicting annotation in the annotations for the portion of content (step 770). This predetermined minimum criteria may be a predetermined threshold number of matching instances, a degree of matching between the annotations and the portion of content, or any other predetermined criteria that may be used to determine if instances within the language model/corpora are sufficient to warrant a maintaining or removal of an annotation from further consideration by the QA system. If the predetermined minimum criteria is not met, then again, the conflicting annotation may be removed from the set of annotations for the portion of content (step 760). If the predetermined minimum criteria is met, then the conflicting annotation may be maintained in the set of annotations for the portion of content (step 730). The operation then terminates. Although FIG. 7 is shown as terminating at this point, it should be appreciated that the process may be repeated for each annotation and each portion of content being analyzed. Furthermore, the results of this operation are a filtered set of annotations for the portion of content which may then be used as a basis for hypothesis creation, candidate answer identification and evaluation, and other operations performed by the QA system pipeline.

Thus, the illustrative embodiments provide mechanisms for identifying and resolving annotation conflicts in annotated content for question and answer systems. The illustrative embodiments generate a filtered set of annotations for the content that reduce the likelihood of skewing of question and answer system results due to the presence of conflicting annotations. Thus, the question and answer system performance is improved as a result.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for resolving annotation conflicts in a portion of text content, the method comprising:

receiving, in the data processing system, a portion of text content for annotating;

performing, by the data processing system, an annotation operation on the portion of text content using a plurality of annotators, wherein the annotation operation includes parsing the portion of text content using natural language processing to identify a set of features in the portion of text content, wherein each annotator in the plurality of annotators generates a set of annotations associated with the set of features identified in the portion of text content, thereby generating a plurality of sets of annotations for the portion of text content;

analyzing, by the data processing system, the plurality of sets of annotations for the portion of text content to identify a conflict between a first annotation and a second annotation in the plurality of sets of annotations;

resolving, by the data processing system, the conflict between the first annotation and the second annotation to generate a resultant set of annotations for the portion of text content; and storing, by the data processing system, the resultant set of annotations in an annotations data structure associated with the portion of text content.

2. The method of claim 1, further comprising:

utilizing the resultant set of annotations for the portion of text content to perform natural language processing operation on the portion of text content.

3. The method of claim 1, further comprising:

performing a question and answer operation, of a question and answer system implemented by the data processing system, on the portion of text content using the resultant set of annotations.

4. The method of claim 1, wherein resolving the conflict between the first annotation and the second annotation comprises at least one of automatically selecting one of the first annotation or the second annotation to include in the resultant set of annotations, presenting conflict information identifying the conflict between the first annotation and the second annotation to a user via a user interface to request user input identifying a desired method to rectify the identified conflict.

5. The method of claim 1, further comprising identifying a domain of the portion of text content, and wherein resolving the conflict between the first annotation and the second annotation comprises selecting one of the first annotation or second annotation based on the identified domain of the portion of text content.

6. The method of claim 5, wherein resolving the conflict between the first annotation and the second annotation comprises at least one of:

performing a reverse lookup of terms in the first annotation and the second annotation, in a domain specific language model for the domain of the portion of text content to determine if there are matching terms in the domain specific language model; or performing a lookup of terms in the first annotation and the second annotation, in a domain specific corpora of information to determine if there are matching terms in the domain specific corpora of information.

7. The method of claim 6, further comprising:

in response to a term in one of the first annotation or the second annotation having a matching term in the domain specific language model or the domain specific corpora of information, determining whether a usage of the matching term meets a predetermined criteria; and in response to the matching term meeting the predetermined criteria, maintaining a corresponding one of the first annotation or second annotation in the resultant set of annotations.

8. The method of claim 7, wherein determining whether a usage of the matching term meets a predetermined criteria comprises:
    determining a number of instances of the matching term in one of the domain specific language model or the domain specific corpora of information;
    comparing the number of instances to a threshold value; and
    in response to the number of instances having a predetermined relationships to the threshold value, determining that the usage of the matching term meets the predetermined criteria.

9. The method of claim 1, wherein the portion of text content is an input question to a question and answer (QA) system to be answered by the QA system by searching a corpus of information.

10. A computer program product comprising a computer readable storage medium having a computer readable program stored therein, wherein the computer readable program, when executed on a computing device, causes the computing device to:
    receive a portion of text content for annotating;
    perform an annotation operation on the portion of text content using a plurality of annotators, wherein the annotation operation includes parsing the portion of text content using natural language processing to identify a set of features in the portion of text content, wherein each annotator in the plurality of annotators generates a set of annotations associated with the set of features identified in the portion of text content, thereby generating a plurality of sets of annotations for the portion of text content;
    analyze the plurality of sets of annotations for the portion of text content to identify a conflict between a first annotation and a second annotation in the plurality of sets of annotations;
    resolve the conflict between the first annotation and the second annotation to generate a resultant set of annotations for the portion of text content; and
    store the resultant set of annotations in an annotations data structure associated with the portion of text content.

11. The computer program product of claim 10, wherein the computer readable program further causes the computing device to:
    utilize the resultant set of annotations for the portion of text content to perform natural language processing operation on the portion of text content.

12. The computer program product of claim 10, wherein the computer readable program further causes the computing device to:
    perform a question and answer operation, of a question and answer system implemented by the data processing system, on the portion of text content using the resultant set of annotations.

13. The computer program product of claim 10, wherein the computer readable program further causes the computing device to resolve the conflict between the first annotation and the second annotation by at least one of automatically selecting one of the first annotation or the second annotation to include in the resultant set of annotations, presenting conflict information identifying the conflict between the first annotation and the second annotation to a user via a user interface to request user input identifying a desired method to rectify the identified conflict.

14. The computer program product of claim 10, wherein the computer readable program further causes the computing device to identify a domain of the portion of text content, and wherein the computer readable program further causes the computing device to resolve the conflict between the first annotation and the second annotation at least by selecting one of the first annotation or second annotation based on the identified domain of the portion of text content.

15. The computer program product of claim 14, wherein the computer readable program further causes the computing device to resolve the conflict between the first annotation and the second annotation by at least one of:
    performing a reverse lookup of terms in the first annotation and the second annotation, in a domain specific language model for the domain of the portion of text content to determine if there are matching terms in the domain specific language model; or
    performing a lookup of terms in the first annotation and the second annotation, in a domain specific corpora of information to determine if there are matching terms in the domain specific corpora of information.

16. The computer program product of claim 13, wherein the computer readable program further causes the computing device to:
    determine, in response to a term in one of the first annotation or the second annotation having a matching term in the domain specific language model or the domain specific corpora of information, whether a usage of the matching term meets a predetermined criteria; and
    in response to the matching term meeting the predetermined criteria, maintaining a corresponding one of the first annotation or second annotation in the resultant set of annotations.

17. The computer program product of claim 16, wherein the computer readable program further causes the computing device to determine whether a usage of the matching term meets predetermined criteria at least by:
    determining a number of instances of the matching term in one of the domain specific language model or the domain specific corpora of information;
    comparing the number of instances to a threshold value; and
    in response to the number of instances having a predetermined relationships to the threshold value, determining that the usage of the matching term meets the predetermined criteria.

18. An apparatus comprising:
    a processor; and
    a memory coupled to the processor, wherein the memory comprises instructions which, when executed by the processor, cause the processor to:
    receive a portion of text content for annotating;
    perform an annotation operation on the portion of text content using a plurality of annotators, wherein the annotation operation includes parsing the portion of text content using natural language processing to identify a set of features in the portion of text content, wherein each annotator in the plurality of annotators generates a set of annotations associated with the set of features identified in the portion of text content, thereby generating a plurality of sets of annotations for the portion of text content;

analyze the plurality of sets of annotations for the portion of text content to identify a conflict between a first annotation and a second annotation in the plurality of sets of annotations;

resolve the conflict between the first annotation and the second annotation to generate a resultant set of annotations for the portion of text content; and store the resultant set of annotations in an annotations data structure associated with the portion of text content.

19. The apparatus of claim 18, wherein the instructions further cause the processor to identify a domain of the portion of text content, and wherein the instructions further cause the processor to resolve the conflict between the first annotation and the second annotation at least by selecting one of the first annotation or second annotation based on the identified domain of the portion of text content.

20. The apparatus of claim 19, wherein the instructions further cause the processor to resolve the conflict between the first annotation and the second annotation by at least one of:

performing a reverse lookup of terms in the first annotation and the second annotation, in a domain specific language model for the domain of the portion of text content to determine if there are matching terms in the domain specific language model; or performing a lookup of terms in the first annotation and the second annotation, in a domain specific corpora of information to determine if there are matching terms in the domain specific corpora of information.

\* \* \* \* \*